United States Patent [19]
Jimbo

[11] Patent Number: 4,993,362
[45] Date of Patent: Feb. 19, 1991

[54] ARTIFICIAL FISH BED

[75] Inventor: Kanichi Jimbo, Tokyo, Japan

[73] Assignee: Toppan Printing Co., Ltd., Japan

[21] Appl. No.: 382,260

[22] Filed: Jul. 19, 1989

[30] Foreign Application Priority Data

Jul. 22, 1988 [JP] Japan .............................. 63-97139[U]

[51] Int. Cl.⁵ .............................................. A01K 61/00
[52] U.S. Cl. ............................................. 119/3; 119/4
[58] Field of Search ................................... 119/2, 3, 4

[56] References Cited

U.S. PATENT DOCUMENTS

| | | | |
|---|---|---|---|
| 3,316,881 | 5/1967 | Fischer | 119/4 |
| 3,675,626 | 7/1972 | Down | 119/4 |
| 3,695,229 | 10/1972 | Renn | 119/4 |
| 3,738,318 | 6/1973 | Woodbridge et al. | 119/4 |
| 3,741,159 | 6/1973 | Halaunbrenner | 119/4 |
| 3,898,958 | 8/1975 | Pranis, Jr. | 119/4 |
| 4,061,110 | 12/1977 | Steidle | 119/4 |
| 4,165,711 | 8/1979 | Aoki | 119/3 |
| 4,244,323 | 1/1981 | Morimura | 119/3 |
| 4,316,431 | 2/1982 | Kimura | 119/3 |
| 4,703,719 | 11/1987 | Mori | 119/3 |

Primary Examiner—Paul J. Hirsch
Attorney, Agent, or Firm—Lerner, David, Littenberg, Krumholz & Mentlik

[57] ABSTRACT

An artificial fish bed or fish-settling installation submerged in a body water has a flat base made of concrete, several supporting poles erected on the concrete base at regular intervals, and several layers of shelves secured to the poles. The shelves extend horizontally and parallel with one another and are separated vertically by cylindrical members having a predetermined length which are inserted on each pole between layers of shelves. Each shelf is formed by superposing openings formed in a plurality of substantially square frames and a plurality of plates, and assembling same over the supporting poles. An end cap is applied to the top or free end of each of the supporting poles to hold the various elements of the fish bed structure in assembled position. Preferably, the frames and plates are also formed from concrete.

9 Claims, 2 Drawing Sheets

ARTIFICIAL FISH BED

FIELD OF THE INVENTION

The present invention relates to an artificial fish bed and, in particular, to an artificial fish-settling installation to be submerged within a body of water.

BACKGROUND OF THE INVENTION

Nowadays, various artificial fish beds of this kind are known, such as one having an arc-shaped section as shown in Japanese Utility Model Application Publication No. 55-88667 and another formed by assembling a plurality of ladder-shaped elements as shown in JUAP No. 56-35265.

According to the prior art mentioned above, these conventional artificial fish beds or fish-settling installations have fixing members or foundations which are formed by heaping stones on the sea floor. The stone-heaping operation for forming the foundation of the artificial fish bed is a very troublesome and labor intensive operation. In addition, the fixing member cannot expand, but only extends horizontally along the sea floor or merely increases in the area of its bottom face which contacts the sea floor. This, of course, is disadvantageous.

It has been proposed to develop an improved artificial fish bed which is easily constructed and installed, capable of enduring strong tidal currents and waves, and able to expand in upwards and downwards directions.

SUMMARY OF THE INVENTION

In accordance with the present invention, the problems of the prior art have now been solved by the provision of an improved artificial fish bed or fish-settling installation having a base; a plurality of parallel supporting poles having first ends connected to the base and free ends extending away from the base, each one of the plurality of poles being separated from an adjacent one of the plurality of poles by a preselected distance; a plurality of shelves arranged on the plurality of poles, each of the plurality of shelves being formed from an assembly of substantially square planar frames and elongated planar plates, the frames having an aperture disposed in each corner, the apertures being separated by the preselected distance, and the elongated plates having a pair of apertures separated by the preselected distance, the apertures in the frames and the apertures in the elongated plates being superposed for accommodating one of the plurality of poles; a plurality of spacing members having a predetermined axial length and an axial aperture for assembly on the plurality of poles, the plurality of shelves and the plurality of spacing members being slidably assembled in alternating layers on the plurality of poles whereby the plurality of spacing members supports and separates the plurality of shelves above the base; and retaining means for retaining the alternating layers of shelves and spacing members in assembled position. In a preferred embodiment, the base, the frames and the plates are formed from concrete, and the plurality of poles and the retaining means are formed from a metal. In a still more preferred embodiment, the retaining means comprise a plurality of end caps threadedly engaged to the free end of each of the plurality of poles.

Optionally, the artificial fish bed of the present invention includes a plurality of nettings connected between the plurality of shelves to provide shaded areas in the artificial fish bed.

It is accordingly an object of the present invention to provide a novel artificial fish bed or fish-settling installation which is easily constructed and installed on the sea floor, which is capable of enduring strong tidal currents and waves, and which is expandable in upwards and downwards directions.

BRIEF DESCRIPTION OF THE DRAWINGS

A more complete appreciation of the subject matter of the present invention and the various advantages thereof can be realized by reference to the following detailed description taken in connection with the accompanying drawings, in which.

DETAILED DESCRIPTION OF THE PREFERRED EMBODIMENTS

Figure 1:
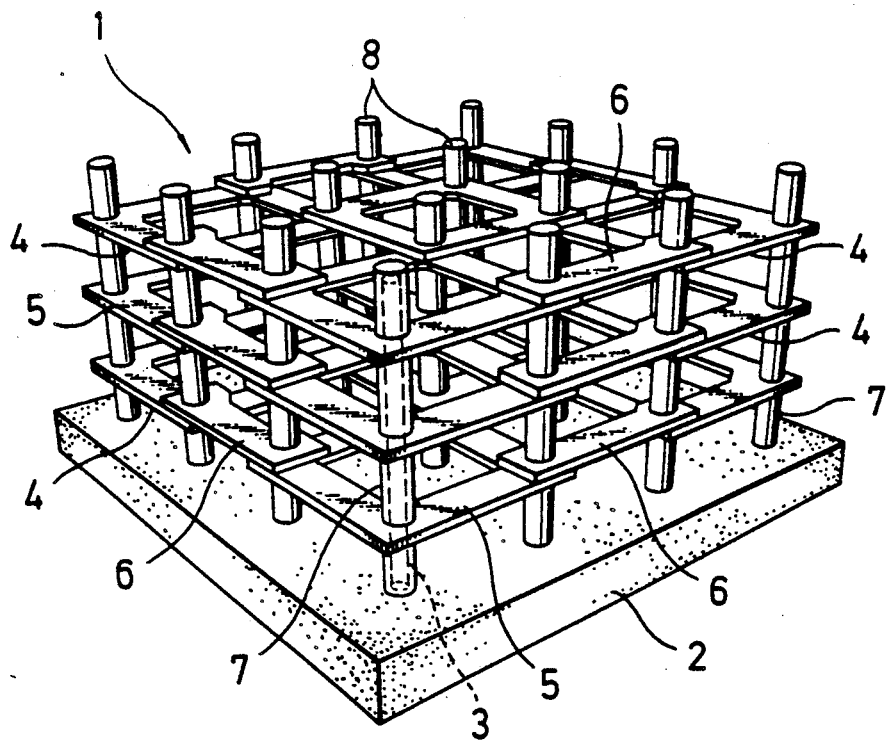
FIG. 1 is perspective view of an artificial fish bed in accordance with one preferred embodiment of the present invention.

Referring to the first embodiment of the present invention shown in FIGS. 1-4, an artificial fish bed or fish-settling installation 1 has a base or foundation 2 made of concrete, a plurality of supporting poles 3 erected on the top surface of the base 2 and separated from one another at equal intervals in both lengthwise and breadthwise directions, and a plurality of shelves 4 stacked vertically one atop the other or in layers having spaces therebetween.

The shelves 4 include a plurality of frames 5 and a plurality of plates 6 having the same thickness as that of the frames, the frames 5 and plates 6 being assembled to construct plural layers of the shelves 4. In the preferred embodiment, each frame or shaped member 5 has a substantially square shape with four openings or through holes 50 respectively positioned at its four corners. The interval or distance between the through holes 50 of the frames 5 is the same as that between the supporting poles 3 erected on the base 2, so that the poles 3 may be aligned with and inserted through the openings 50 of the frames. Similarly, each plate 6 has a pair of openings or through holes 60 formed therein at the same interval as that between the supporting poles 3 on the base 2, the positions of the openings 60 coinciding with the supporting poles 3.

Figure 2:
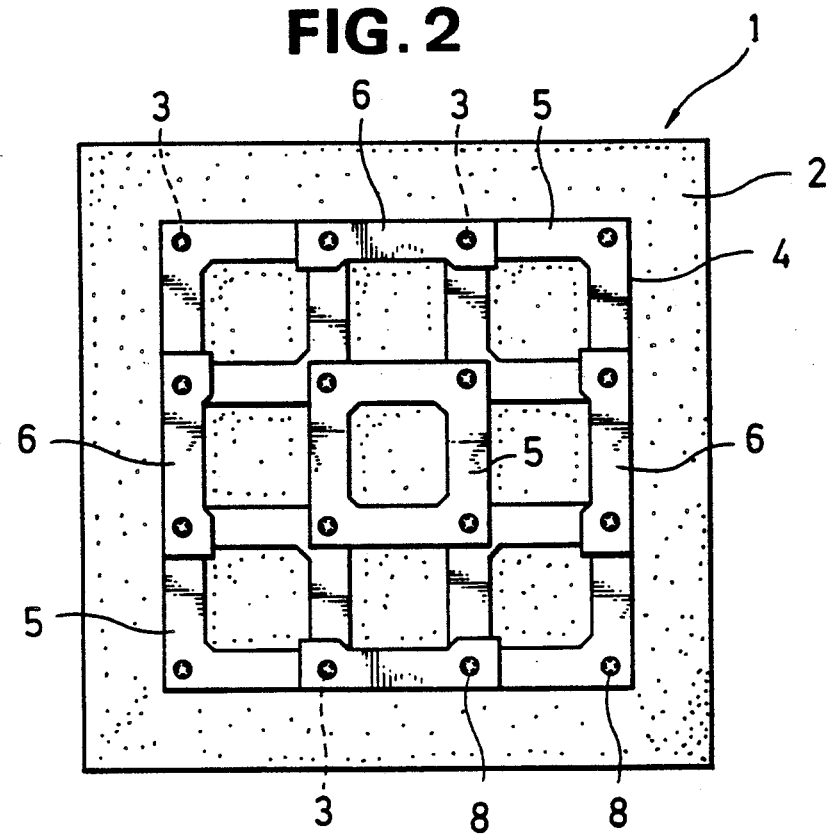
FIG. 2 is a top plan view of the artificial fish bed of FIG. 1.
Figure 3:
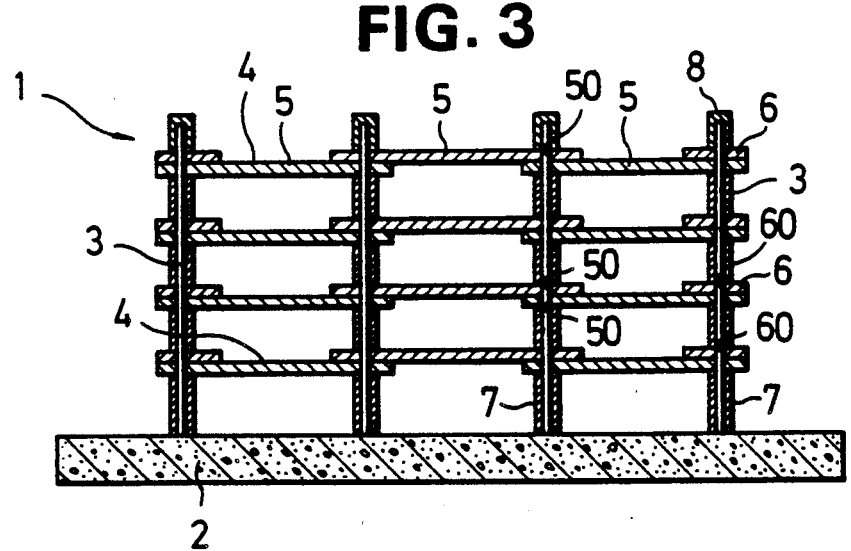
FIG. 3 is a cross-sectional explanatory view of the artificial fish bed shown in FIG. 1.

Each layer of the artificial fish bed 1 of the present invention is formed by assembling a plurality of frames 5 on supporting poles 3 such that they coextend in a single plane. A plurality of plates 6 and frames 5 are then assembled over the coextending plane formed by frames 5, thereby connecting the individual frames 5 together, as shown in FIG. 2. Such assembly operation is extended in a lengthwise and breadthwise direction along the top surface of the base 2 in order to form each layer of the artificial fish bed 1.

Figure 5:
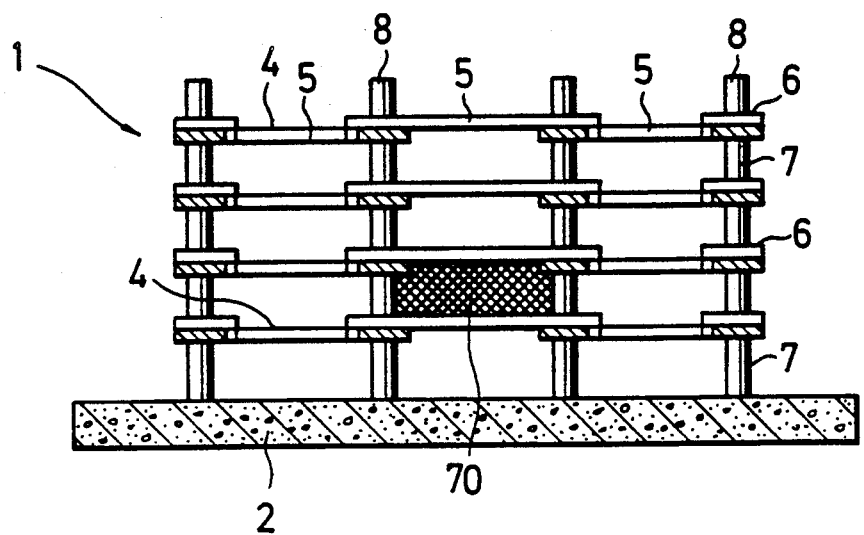
FIG. 5 is a cross-sectional explanatory view of an artificial fish bed in accordance with another preferred embodiment of the present invention.

As can be seen in FIGS. 1 and 5, a plurality of cylindrical members function as supporters during the assembly of artificial fish bed 1. By interposing and inserting the cylindrical members 7 on supporting poles 3 between adjacent layers formed by frames 5 and plates 6, the shelves 4 at various levels are separated vertically by a predetermined height or distance. In the preferred embodiment of the present invention, sixteen supporting poles 3 are erected on the base 2 in an array of, for example, four poles by four poles, and a cylindrical member 7 is inserted on each of these supporting poles 3. Subsequently, one frame 5 is inserted on the four supporting poles 3 at each of the four corners of one shelf 4, respectively, as shown in FIG. 2, and one frame 5 is inserted on the four supporting poles 3 located at a central portion of the assembly, overlaying each of the four corners of the central frame 5 on the respective innermost or centralized corners of the frames 5 firstly placed at the corners of the assembled shelf 4. One plate 6 is placed between one inner and outer corner of one frame 5 and one inner and outer corner of another frame 5 along one of the four sides of the square shelf 4. As shown in FIG. 2, a total of four plates 6 are placed on the respective sides of the square in the manner described. It is apparent from the assembly method described that each of the sixteen supporting poles 3 is inserted through the coinciding openings between either two frames 5 or a frame 5 and a plate 6, thereby forming a single shelf 4. Subsequently, sixteen cylindrical members 7 are inserted one by one on each of the sixteen supporting poles 3. By repeating the assembly of frames 5, plates 6 and cylindrical member 7 as described above, an artificial fish bed having a desired number of separated shelves 4 may be formed.

In the final stage of assembling or installing the artificial fish bed 1 of the present invention, sixteen stoppers or end caps 8 are applied onto the exposed top or free ends of the supporting poles 3 erected on the concrete base 2. The end caps 8 may be formed with various cross-sectional shapes, such as a cylinder, square or polygon, and preferably are secured to the free ends of supporting poles 3 by any suitable means, including screwing, threading, concreting, and the like, thereby preventing any of the frames 5, plates 6 or cylindrical members 7 from floating upwards or becoming disassembled from the supporting poles 3.

Figure 4:
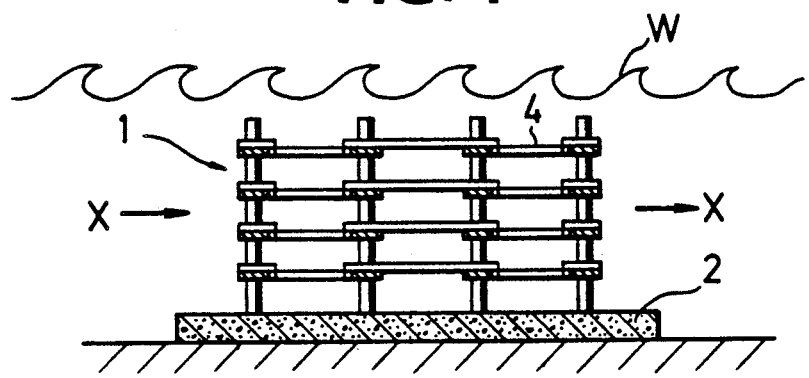
FIG. 4 is a side elevational view showing the artificial fish bed of FIG. 1 installed on the sea floor.

Preferably, the base 2 of the fish bed 1 is placed on a substantially horizontal surface of the sea floor, so that the respective surfaces of shelves 4 extend horizontally or parallel with the sea floor as shown in FIG. 4. As a result, a wave W or tidal current flowing along the direction of arrow X shown in FIG. 4 has no affect on the artificial fish bed 1 installed on the sea floor.

According to another preferred embodiment of the present invention shown in FIG. 5, coarse wire nettings or gratings 70 are placed in the space between the frames 5 and plates 6 in one shelf 4 and the frames 5 and plates 6 in an adjacent shelf 4. The edges of the coarse wire netting 70 are fixed to the bottom and top faces of the frames 5 or plates 6, respectively. As shown in FIG. 5, oyster shells and the like are placed or fixed on and around the gratings or coarse wire nettings 70, thereby providing shade for the fish residing in the artificial fish-settling installation.

In assembling the fish bed 1 of the present invention, a plurality of columns or supporting poles are erected on a concrete base in a suitable arrangement at predetermined positions. Several sets of frames, plates and cylindrical members are inserted on the supporting poles through openings formed at each corner of the frames and end portions of the plates in order to assemble several horizontal layers of shelves, end caps being secured to the free ends of the columns after the several layers of shelves have been assembled thereon. It should be noted that the assembling operation of the artificial fish bed 1 can be performed on land, ship, or the surface of the sea, and the completed fish bed may then be submerged and installed on the sea floor.

Obviously, the height of the fish bed can be increased simply by increasing the number of layers which are formed. Additionally, changing the length of the cylindrical members 7 will alter the number of layers of shelves 4 which can be assembled on the supporting poles, as well as the vertical distance therebetween. By assembling the shelves 4 on supporting poles 3 which are fixed to the base 2, the shelves are prevented from thrusting or moving in a horizontal direction. Moreover, since the shelves 4 are securely held in a horizontal orientation, they provide little resistance to oncoming currents and waves so that no breakage or movement of the fish-settling installation occurs. Hence, the artificial fish bed 1 of the present invention provides a practical and durable installation.

The various frames, plates, cylindrical members and end caps which form the artificial fish bed of the present invention may be made from any suitable material, such as metal, concrete, plastic and the like. In addition, the artificial fish bed may be assembled from individual components which are all made from the same material or, alternatively, from a combination of components each formed from a material which is most suitable for the particular component.

I claim:

1. An artificial fish bed comprising,
   a base,
   a plurality of parallel supporting poles having first ends connected to said base and free ends extending away from said base, each one of said plurality of poles being separated from an adjacent one of said plurality of poles by a preselected distance,
   a plurality of shelves arranged on said plurality of poles, each of said plurality of shelves being formed from an assembly of substantially square planar frames and elongated planar plates, said frames having an aperture disposed in each corner, said apertures being separated by said preselected distance, and said elongated plates having a pair of apertures separated by said preselected distance, said apertures in said frames and said apertures in said elongated plates being superposed for accommodating one of said plurality of poles,
   a plurality of spacing members having a predetermined axial length and an axial aperture for assembly on said plurality of poles, said plurality of shelves and said plurality of spacing members being slidably assembled in alternating layers on said plurality of poles, whereby said plurality of spacing members supports and separates said plurality of shelves above said base, and
   retaining means for retaining said alternating layers of shelves and spacing members in assembled condition.

2. An artificial fish bed as claimed in claim 1 further comprising a plurality of nettings connected between said plurality of shelves to provide shaded areas in said artificial fish bed.

3. An artificial fish bed as claimed in claim 1 wherein said base, said frames and said plates are formed from concrete.

4. An artificial fish bed as claimed in claim 3 wherein said plurality of poles and said retaining means are formed from a metal.

5. An artificial fish bed as claimed in claim 4 further comprising a plurality of nettings connected between said plurality of shelves to provide shaded areas in said artificial fish bed.

6. An artificial fish bed as claimed in claim 1, wherein said retaining means comprise a plurality of end caps threadedly engaged to said free end of each of said plurality of poles.

7. An artificial fish bed as claimed in claim 6 wherein said base, said frames and said plates are formed from concrete.

8. An artificial fish bed as claimed in claim 7 wherein said plurality of poles and said plurality of end caps are formed from a metal.

9. An artificial fish bed as claimed in claim 8 further comprising a plurality of nettings connected between said plurality of shelves to provide shaded areas in said artificial fish bed.

* * * * *